US012607969B2

(12) United States Patent
Enta

(10) Patent No.: US 12,607,969 B2

(45) Date of Patent: Apr. 21, 2026

(54) MODULE AND TIMEPIECE

(71) Applicant: CASIO COMPUTER CO., LTD., Tokyo (JP)

(72) Inventor: Yoshihiko Enta, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 356 days.

(21) Appl. No.: 18/254,657

(22) PCT Filed: Oct. 22, 2021

(86) PCT No.: PCT/JP2021/039929

§ 371 (c)(1), (2) Date: May 26, 2023

(87) PCT Pub. No.: WO2022/113640

PCT Pub. Date: Jun. 2, 2022

(65) Prior Publication Data

US 2024/0019815 A1 Jan. 18, 2024

(30) Foreign Application Priority Data

Nov. 27, 2020 (JP) ................................ 2020-197015

(51) Int. Cl.
*G04G 17/04* (2006.01)

(52) U.S. Cl.
CPC .................................. *G04G 17/045* (2013.01)

(58) Field of Classification Search
None
See application file for complete search history.

(56) References Cited

U.S. PATENT DOCUMENTS 4,236,240 A 11/1980 Yoshida
4,250,572 A 2/1981 Yoshida
(Continued)

FOREIGN PATENT DOCUMENTS

GB 2032146 A 4/1980
GB 2072896 A * 10/1981 ........... G04G 9/0082
(Continued)

OTHER PUBLICATIONS

JPO machine translation of JP 3571777 (Year: 2025).*
(Continued)

*Primary Examiner* — Regis J Betsch
*Assistant Examiner* — Michael James Walker
(74) *Attorney, Agent, or Firm* — Scully, Scott, Murphy & Presser, P.C.

(57) ABSTRACT

A module which enables slimming down and a timepiece provided with the module are provided. The timepiece module includes a timepiece movement which is a driving section that moves pointers, and a liquid crystal display panel which has an opening section where the timepiece movement is arranged, and is arranged in parallel with the timepiece movement. Since the timepiece movement is arranged in the opening section of the liquid crystal display panel and positioned in parallel with the liquid crystal display panel, the timepiece movement and the liquid crystal display panels do not vertically overlap with each other, whereby the slimming down of the entire timepiece module can be achieved, which enables the slimming down of the entire wristwatch.

10 Claims, 13 Drawing Sheets

(56) References Cited

U.S. PATENT DOCUMENTS

| | | | | | |
|---|---|---|---|---|---|
| 4,436,435 | A | | 3/1984 | Ushikoshi | |
| 6,084,828 | A | * | 7/2000 | Bland | G04G 9/0082 368/80 |
| 2003/0165086 | A1 | * | 9/2003 | Brewer | G02F 1/133536 368/82 |
| 2015/0029829 | A1 | | 1/2015 | Spadini | |

FOREIGN PATENT DOCUMENTS

| | | | | |
|---|---|---|---|---|
| JP | S5554485 | A | | 4/1980 |
| JP | S5596480 | A | | 7/1980 |
| JP | S56172786 | U | | 12/1981 |
| JP | S60122887 | U | | 8/1985 |
| JP | H08129078 | A | | 5/1996 |
| JP | 3571777 | B2 | * | 9/2004 |

OTHER PUBLICATIONS

Extended European search report dated Sep. 18, 2024 received in European Patent Application No. 21897616.5.

Chinese Office Action dated Oct. 20, 2025 received in Chinese Application No. 202180091544.1.

* cited by examiner

MODULE AND TIMEPIECE

CROSS REFERENCE TO RELATED APPLICATIONS

This is a U.S. National Phase application of International Application No. PCT/JP2021/039929, filed Oct. 22, 2021, which is based on and claims priority from Japanese Patent Application No. 2020-197015, filed on Nov. 27, 2020, the entire contents of both of which are incorporated herein by reference.

TECHNICAL FIELD

The present invention relates to a module that is used in devices such as timepieces and measuring instruments, and a timepiece provided with the module.

BACKGROUND ART

For example, a timepiece module is known which has a structure where a timepiece movement that serves as a driving section for moving pointers is arranged under a display panel for electrooptically displaying information such as time information, as shown in Patent Document 1.

PRIOR ART DOCUMENT

Patent Document

Patent Document 1: JP 08-129078

SUMMARY OF INVENTION

Problem to be Solved by the Invention

This type of module is structured such that a pointer shaft provided on the timepiece movement is inserted into a shaft hole formed in the display panel and protrudes above the display panel, and the pointers are attached to upper end portions of the protruding pointer shaft and moved above the display panel.

However, this type of timepiece module has a problem in that it is thick as a whole because of the structure where the timepiece movement is arranged under the display panel and they overlap each other, whereby the timepiece as a whole cannot be slimmed down.

An object of the present invention is to provide a module which enables slimming down, and a timepiece provided with the module.

Means for Solving the Problem

The present invention is a module comprising: a driving section which moves a pointer; a display section which has an opening section where the driving section is arranged, and is arranged in parallel with the display section.

BRIEF DESCRIPTION OF DRAWINGS

FIG. 6 is a diagram showing the liquid crystal cell of a liquid crystal display panel on the timepiece module shown in FIG. 3, in which

FIG. 7 is a diagram showing an upper housing for the timepiece module shown in FIG. 3, in which

FIG. 8 is a diagram showing a state where the liquid crystal cell has been mounted on the upper housing shown in FIG. 7B, in which

FIG. 9 is a diagram showing a state where a timepiece movement has been mounted on a holding member of the timepiece module shown in FIG. 2, in which

FIG. 11 is a diagram showing a circuit board shown in FIG. 2, in which

DESCRIPTION OF EMBODIMENTS

An embodiment where the present invention has been applied in a wristwatch will hereinafter be described with reference to FIG. 1 to FIG. 12.

Figure 1:
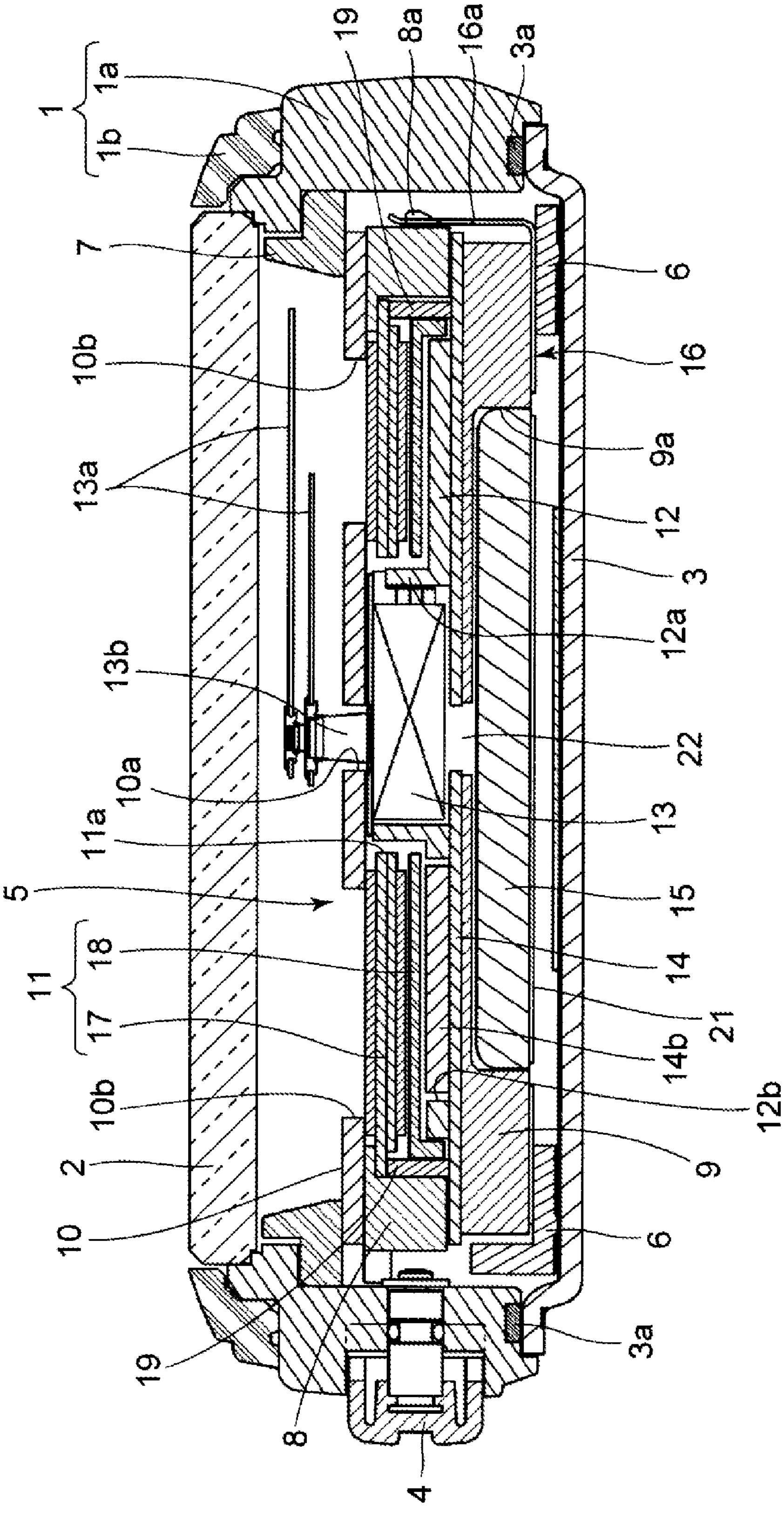
FIG. 1 is an enlarged cross-sectional view of an embodiment where the present invention has been applied in a wristwatch.

This wristwatch includes a wristwatch case 1, as shown in FIG. 1. The wristwatch case 1 includes a main body case 1*a* and an exterior case 1*b*, and has a structure where the exterior case 1*b* is arranged on an upper outer circumferential portion of the main body case 1*a*.

In the upper opening of the wristwatch case 1, a watch glass 2 is provided, as shown in FIG. 1. Also, to the lower part of the wristwatch case 1, a back cover 3 is attached via a waterproof ring 3*a*. Moreover, on outer circumferential portions of the wristwatch case 1, a plurality of push button switches 4 is provided. In the wristwatch case 1, a timepiece module 5 is provided via a middle frame 6. In an area between the timepiece module 5 and the watch glass 2, a parting member 7 having a ring shape is arranged.

Figure 2:
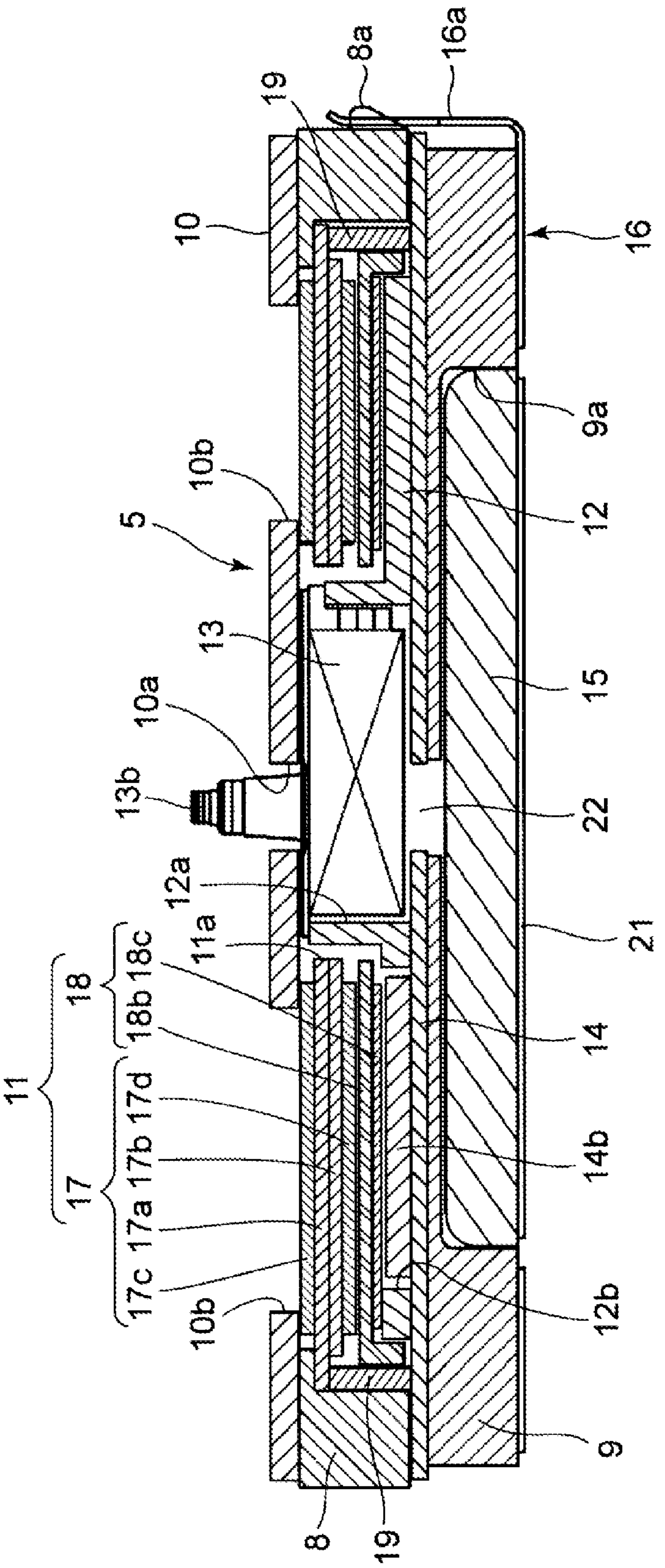
FIG. 2 is an enlarged cross-sectional view of a timepiece module in the wristwatch shown in FIG. 1.
Figure 3:
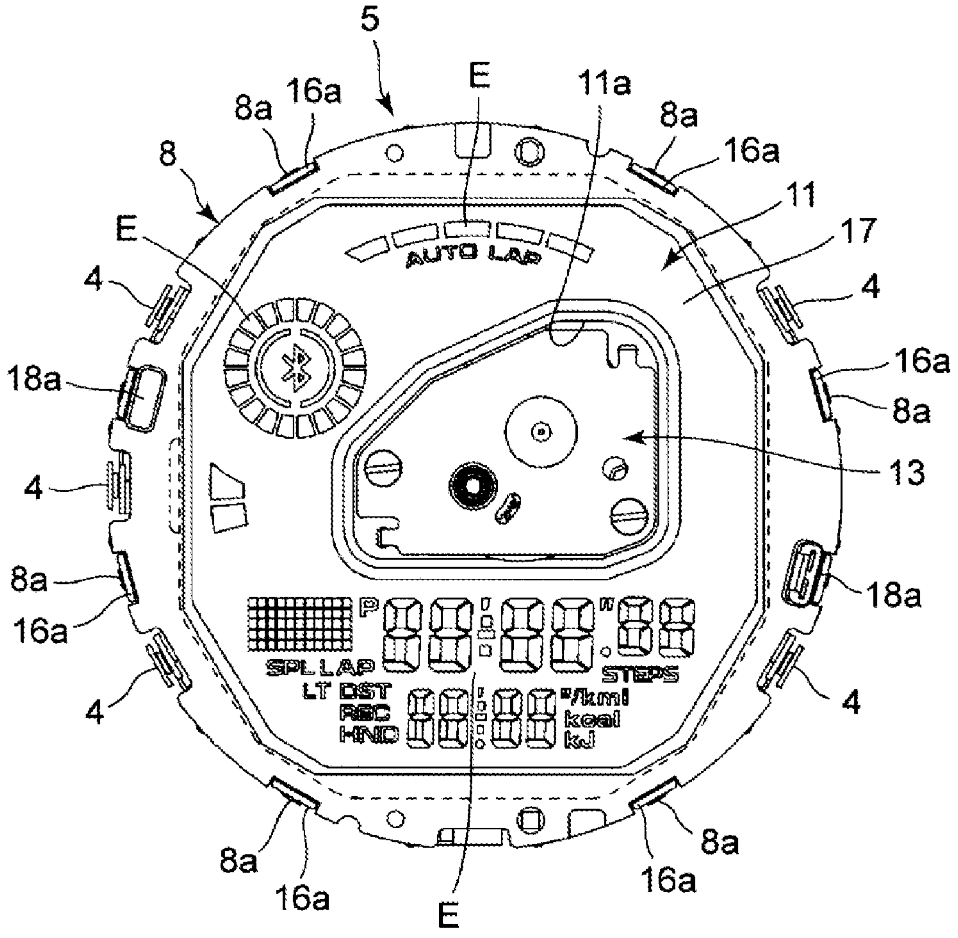
FIG. 3 is an enlarged front view of the timepiece module shown in FIG. 2.
Figure 4:
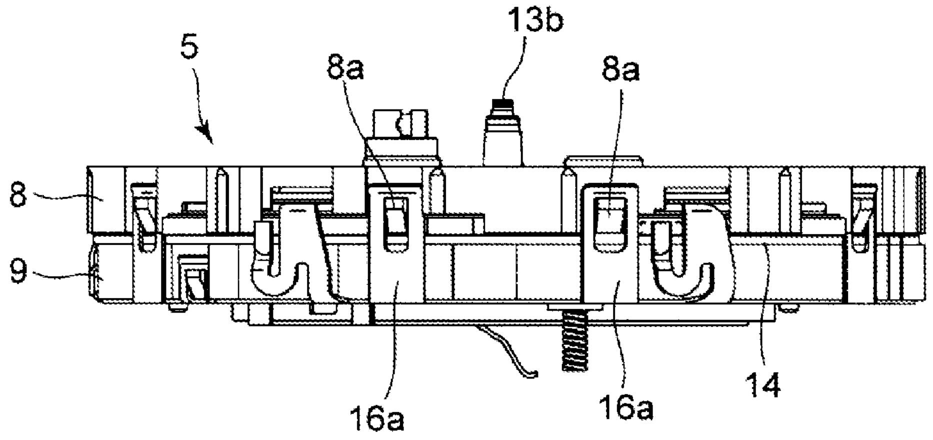
FIG. 4 is an enlarged side view showing the three o'clock side of the timepiece module in FIG. 3.

The timepiece module 5 has an upper housing 8 which is a first housing and a lower housing 9 which is a second housing, as shown in FIG. 1 and FIG. 2. On the upper part of the upper housing 8, a dial plate 10 is arranged. In this upper housing 8, a liquid crystal display panel 11 which is a display section and a timepiece movement 13 which is a driving section held by a holding member 12 are arranged in parallel with each other. The liquid crystal display panel 11 is substantially equal in size to the upper housing 8, and is provided in the upper housing 8 while covering the opening of the upper housing 8, as shown in FIG. 1 to FIG. 3. That is, the liquid crystal display panel 11 is substantially equal in size to the timepiece module 5.

The lower housing 9 is arranged on the lower part of the upper housing 8 via a circuit board 14, as shown in FIG. 1 and FIG. 2. In this lower housing 9, a battery housing section 9*a* which houses a large-capacity battery 15 is formed. The upper housing 8 and this lower housing 9 are attached to each other by a plurality of hook sections 16*a* of a circuit holding plate 16 called a base plate with the circuit board 14 being held therebetween, as shown in FIG. 1 to FIG. 5.

More specifically, the circuit holding plate 16 is a thin plate made of a metal such as stainless steel, and arranged on the undersurface of the lower housing 9, as shown in FIG. 1 to FIG. 5. The plurality of hook sections 16*a* is structured such that these hook sections 16*a* extend from outer circumferential portions of the circuit holding plate 16 to the outer circumferential surface of the upper housing 8 through the outer circumferential surfaces of the lower housing 9 and the circuit board 14, and the upper ends of these extending hook sections 16*a* are caught by a plurality of catching projections 8*a* formed on the outer circumferential surface of the upper housing 8.

As a result, the upper housing 8 and the lower housing 9 are structured such that, by the plurality of hook sections 16*a* of the circuit holding plate 16 on the undersurface of the lower housing 9 being caught by the plurality of catching projections 8*a* of the upper housing 8, these housings 8 and 9 are attached to each other with the circuit board 14 being held therebetween, as shown in FIG. 1 to FIG. 5.

The liquid crystal display panel 11 in the upper housing 8 includes a liquid crystal cell 17 and a lighting device 18, as shown in FIG. 1 and FIG. 2. The liquid crystal cell 17 has a structure where liquid crystal (not shown) has been enclosed between a pair of upper and lower transparent electrode substrates 17*a* and 17*b*, an upper polarizing plate 17*c* has been arranged on the upper surface of the upper electrode substrate 17*a*, and a lower polarizing plate 17*d* has been arranged on the undersurface of the lower electrode substrate 17*b*, as shown in FIG. 2 and FIG. 6.

Figure 6A:
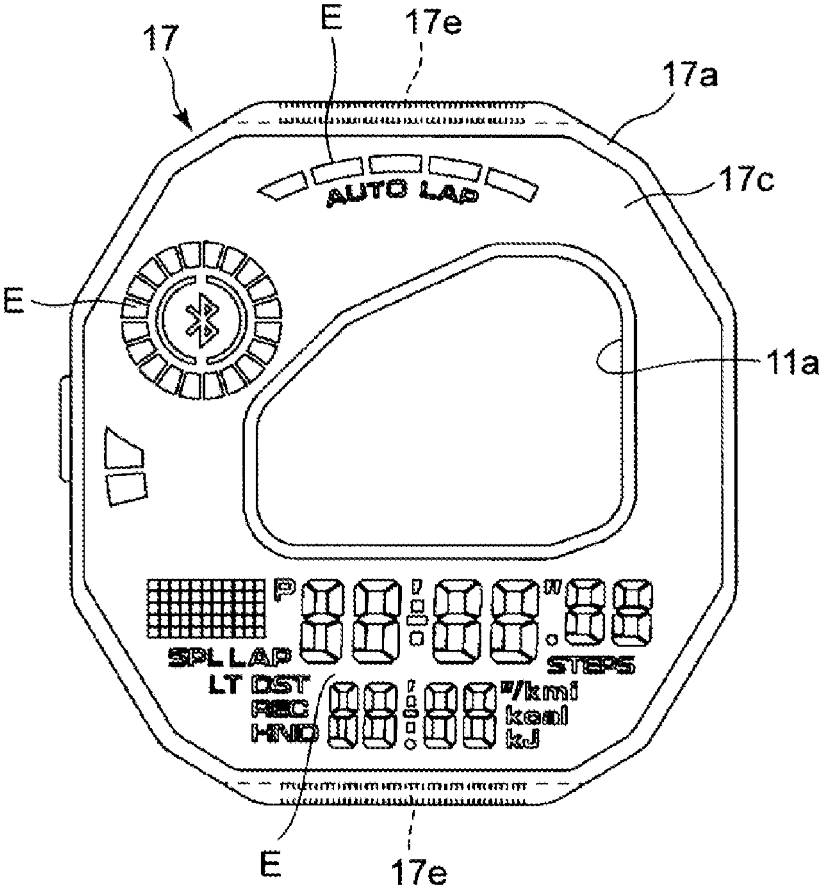
FIG. 6A is an enlarged front view thereof and FIG. 6B is an enlarged side view showing the three o'clock side thereof.

As a result, the liquid crystal cell 17 is structured such that, when voltages are selectively applied to plural areas between the pair of transparent electrode substrates 17*a* and 17*b*, each liquid crystal molecule arrangement in the areas where the voltages have been applied is altered, and various types of information such as a time of day, a date, and a day of the week is electrooptically displayed by the light transmission status of each area being altered in response to the alteration of each liquid crystal molecule arrangement, as shown in FIG. 1 and FIG. 2. In the case of the present embodiment, in the liquid crystal cell 17, a plurality of display areas E for displaying various types of information such as a time of day, a date, and a day of the week is provided, as shown in FIG. 3 and FIG. 6A.

Figure 11A:
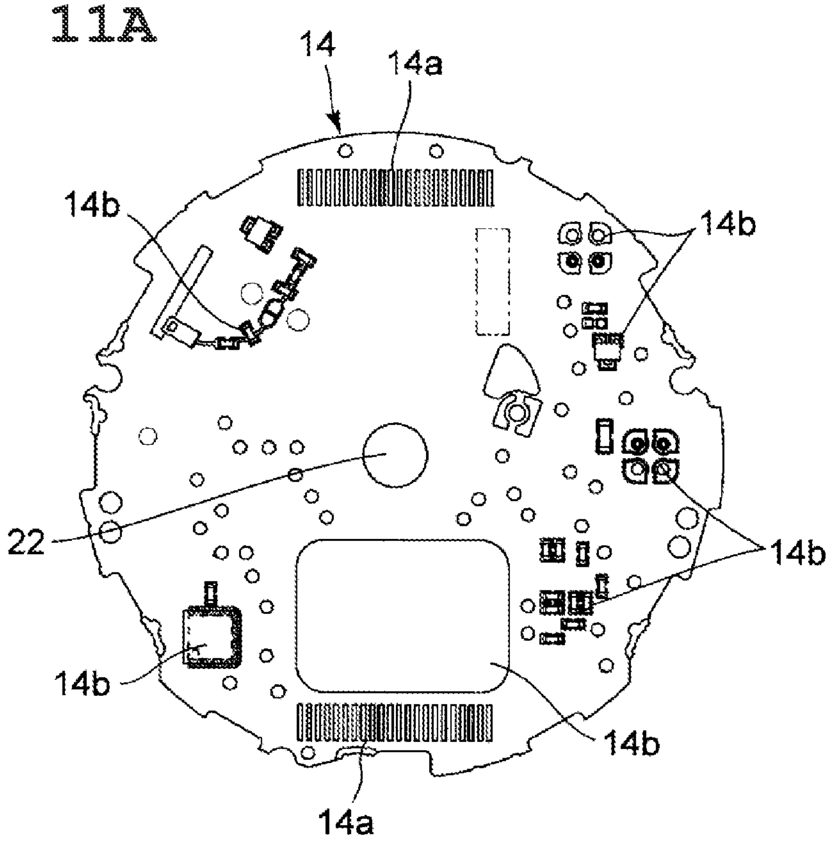
FIG. 11A is an enlarged front view thereof.

The liquid crystal cell 17 has electrode sections 17*e* provided on the undersurfaces of edge portions of the upper electrode substrate 17*a* on the twelve o'clock side and the six o'clock side, and is structured to be held in the upper housing 8 with the electrode sections 17*e* being electrically connected to electrode terminal sections 14*a* of the circuit board 14 in FIG. 11A by interconnectors 19, as shown in FIG. 1, FIG. 2, and FIG. 6.

The lighting device 18 is to illuminate the undersurface of the liquid crystal cell 17, and includes light source sections 18*a*, a light guide plate 18*b*, and a reflective plate 18*c*, as shown in FIG. 1, FIG. 2, and FIG. 7. The light source sections 18*a* are high-intensity light emitting diodes (LEDs), and arranged on two outer circumferential portions of the upper housing 8 on the four o'clock side and the ten o'clock side while opposing each other.

The light guide plate 18*b*, which leads the light of the light source sections 18*a* to the undersurface of the liquid crystal cell 17 so as to illuminate it, is arranged on the undersurface of the liquid crystal cell 17, as shown in FIG. 1 and FIG. 2. The reflective plate 18*c*, which reflects light leaked downward from the light guide plate 18*b* back into the light guide plate 18*b*, is arranged on the undersurface of the light guide plate 18*b*.

The timepiece movement 13 is to drive pointers 13*a* such as an hour pointer and a minute pointer, as shown in FIG. 1 and FIG. 2. Although not shown in the drawings, the timepiece movement 13 is structured to transmit the rotation of a step motor to a pointer wheel by a wheel train mechanism, rotate a pointer shaft 13*b*, and drive the pointers 13*a* by the rotation of the pointer shaft 13*b*. The holding member 12 includes a housing and holding section 12*a* which houses and holds the timepiece movement 13, and is structured to be arranged in the upper housing 8 together with the liquid crystal display panel 11.

In the liquid crystal display panel 11, an opening section 11*a* where the timepiece movement 13 is arranged together with the housing and holding section 12*a* of the holding member 12 is formed penetrating vertically, as shown in FIG. 1 to FIG. 3. More specifically, this opening section 11*a* is formed penetrating the liquid crystal cell 17, the light guide plate 18*b*, and the reflective plate 18*c*.

Figure 6B:
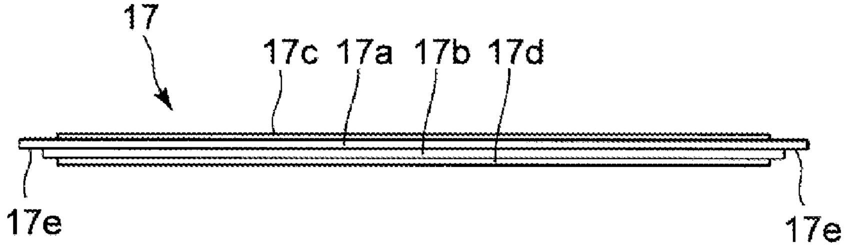

As a result, the liquid crystal cell 17 has a structure in which, when liquid crystal is to be enclosed between the pair of transparent electrode substrates 17*a* and 17*b* having the opening section 11*a*, sealing materials (not shown) are provided on the outer circumferential portions of the pair of electrode substrates 17*a* and 17*b* and the rim of the opening section 11*a*, liquid crystal is injected between the pair of electrode substrates 17*a* and 17*b* in this state, the upper polarizing plate 17*c* having the opening section 11*a* is provided on the upper surface of the upper electrode substrate 17*a*, and the lower polarizing plate 17*d* having the opening section 11*a* is provided on the undersurface of the lower electrode substrate 17*b*, as shown in FIG. 6A and FIG. 6B.

Accordingly, the liquid crystal cell 17 has the plurality of display areas E provided on its portions excluding the opening section 11*a*, as shown in FIG. 1 to FIG. 3. That is, all the portions other than the opening section 11*a* are the display areas E where display can be performed. Also, the timepiece movement 13 is structured to be arranged in the opening section 11*a* of the liquid crystal display panel 11 and positioned in parallel with the liquid crystal display panel 11. The holding member 12 is arranged under the liquid crystal display panel 11 with the housing and holding section 12*a* being arranged in the opening section 11*a* of the liquid crystal display panel 11 together with the timepiece movement 13.

Also, the opening section 11*a* of the liquid crystal display panel 11 is formed in a manner to include the center of the liquid crystal display panel 11, as shown in FIG. 1 to FIG. 3. At this center of the liquid crystal display panel 11, the pointer shaft 13*b* of the timepiece movement 13 is arranged. The axial length of this pointer shaft 13*b*, that is, the vertical length of this pointer shaft 13*b* is formed short because of the structure where the timepiece movement 13 is arranged in the opening section 11*a* of the liquid crystal display panel 11 and positioned in parallel with the liquid crystal display panel 11.

On the other hand, on the upper surface (front surface) of the circuit board 14, a plurality of electronic components 14*b* such as a Large-Scale Integration chip (LSI) is mounted in areas excluding an area corresponding to the timepiece movement 13 shown in FIG. 2, that is, an area corresponding to the opening section 11*a* of the liquid crystal display panel 11, as shown in FIG. 11A. In addition, on the undersurface (back surface) of the circuit board 14, a plurality of electronic components 14*c* such as a quartz crystal unit and a coil is mounted in areas excluding an area corresponding to the battery housing section 9*a* of the lower housing 9 shown in FIG. 2, as shown in FIG. 11B.

Figure 9A:
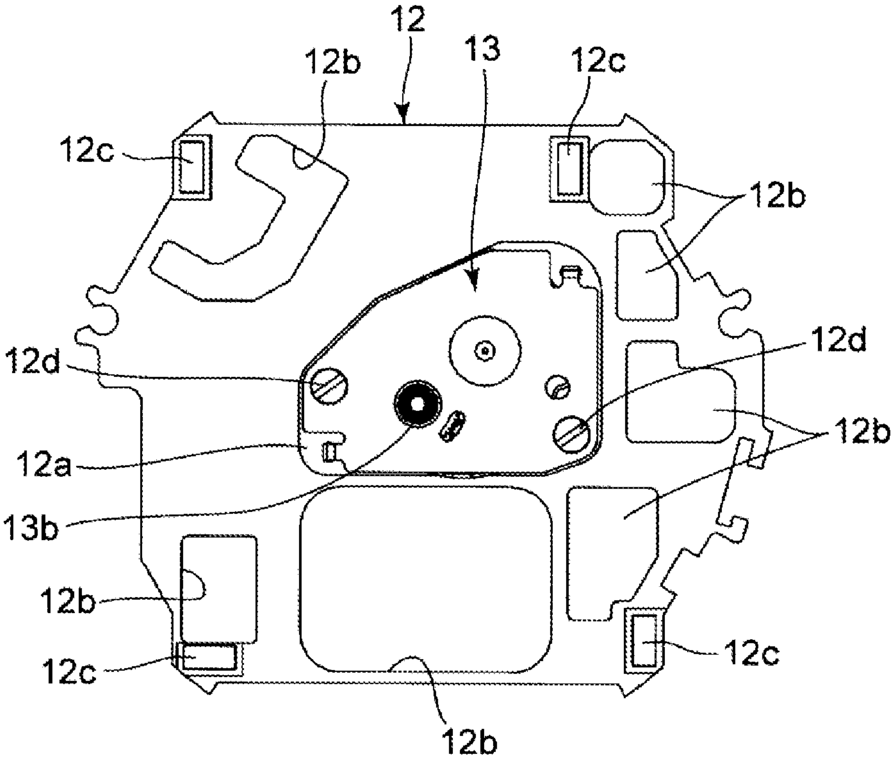
FIG. 9A is an enlarged front view thereof and FIG. 9B is an enlarged rear view thereof.

As a result, the circuit board 14 is structured such that, when it is arranged between the upper housing 8 and the lower housing 9, the plurality of electronic components 14*b* provided on its upper surface is arranged under the liquid crystal display panel 11 while being housed in a plurality of component housing sections 12*b* formed in the holding member 12, as shown in FIG. 2, FIG. 9A, and FIG. 11A.

Figure 11B:
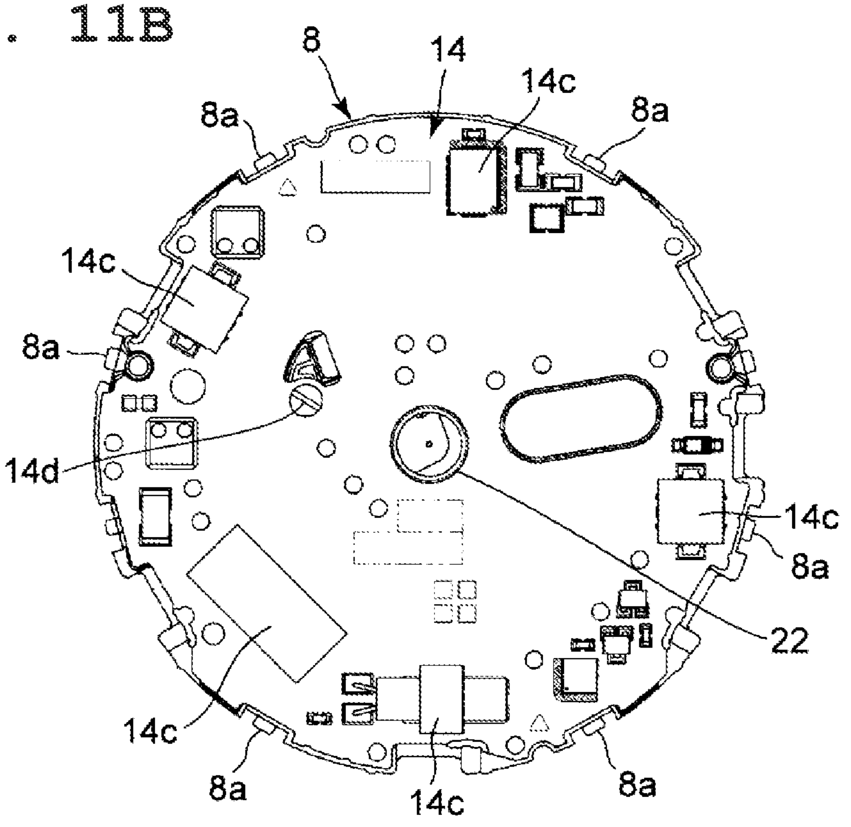
FIG. 11B is an enlarged rear view showing a state where the circuit board has been arranged under the upper housing.

Also, the circuit board 14 is structured such that, when it is arranged between the upper housing 8 and the lower housing 9, the plurality of electronic components 14*c* provided on the undersurface is housed in a plurality of component housing portions (not shown) formed in the lower housing 9, as shown in FIG. 2 and FIG. 11B. In the present embodiment, the plurality of electronic components 14*c* is provided on outer circumferential portions of the undersurface of the circuit board 14 while avoiding the battery housing section 9*a* of the lower housing 9.

Figure 12:
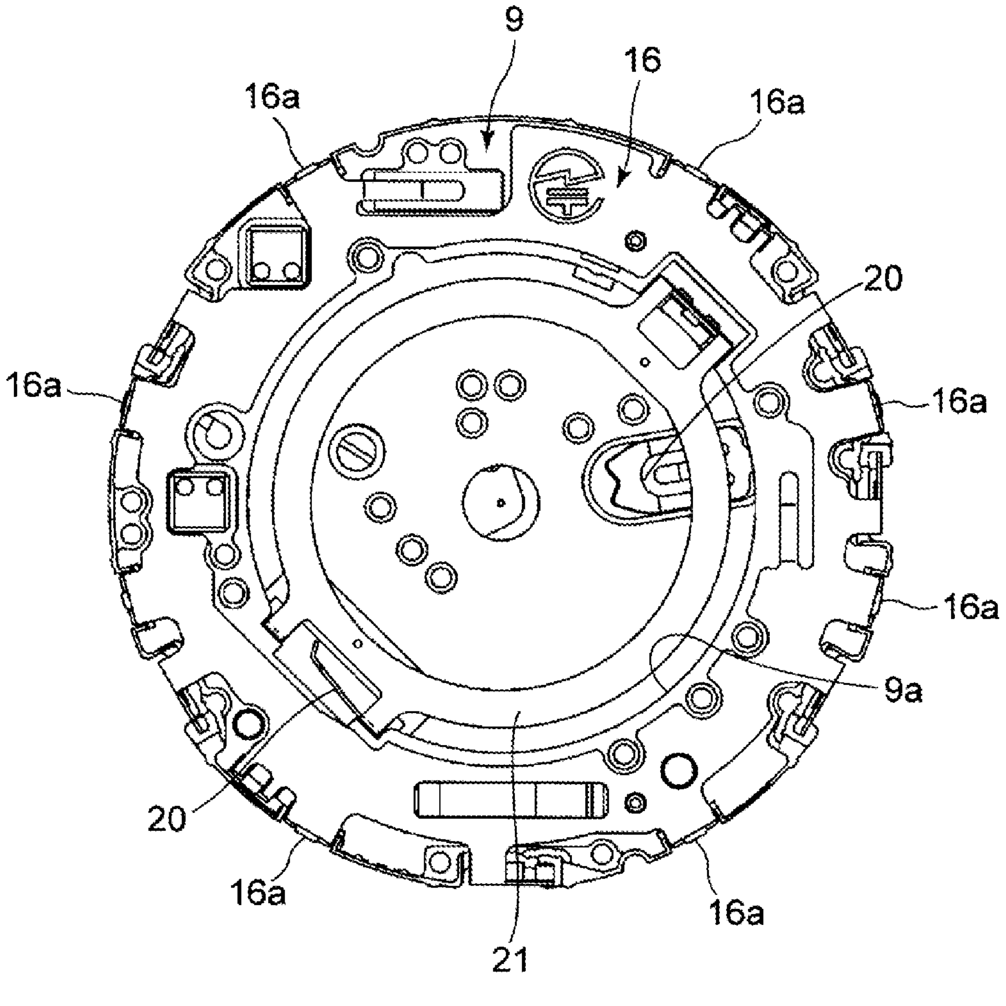
FIG. 12 is an enlarged rear view showing a state where a lower housing has been arranged under the circuit board shown in FIG. 11.

The battery housing section 9*a* of the lower housing 9 is formed in a circular shape in a large area at the center of the lower housing 9 and is open downward, as shown in FIG. 1, FIG. 2, and FIG. 12. In this battery housing section 9*a*, a pair of electrode pieces 20 that comes in contact with the electrodes of the battery 15 is provided. In addition, in this battery housing section 9*a*, a battery hold-down plate 21 is provided which holds the battery 15 housed in the battery housing section 9*a*.

Next, a procedure for assembling this wristwatch is described.

Figure 7A:
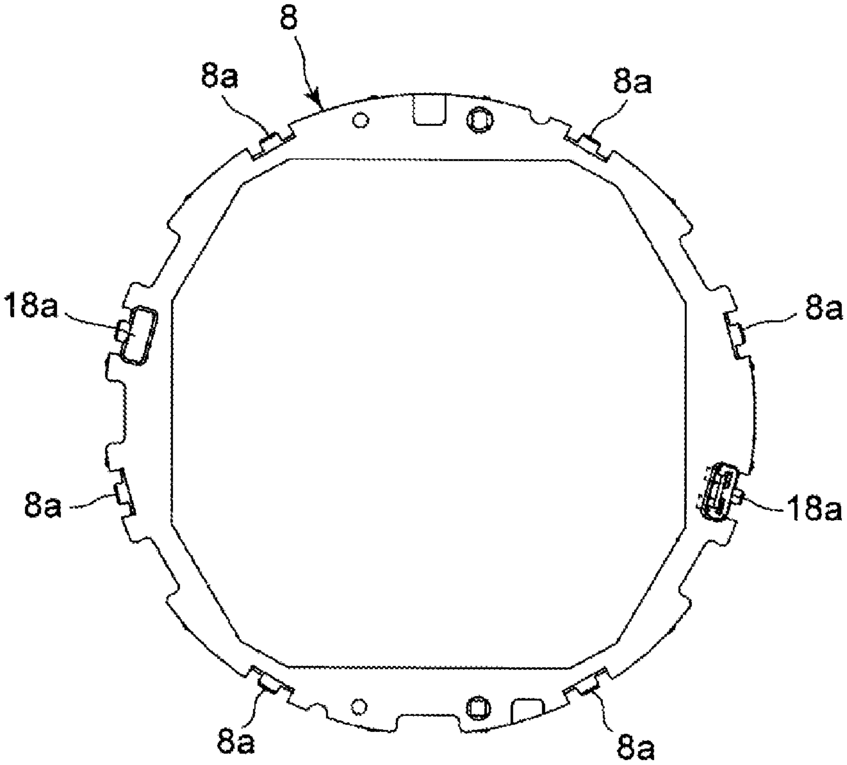
FIG. 7A is an enlarged front view thereof and FIG. 7B is an enlarged rear view thereof.
Figure 7B:
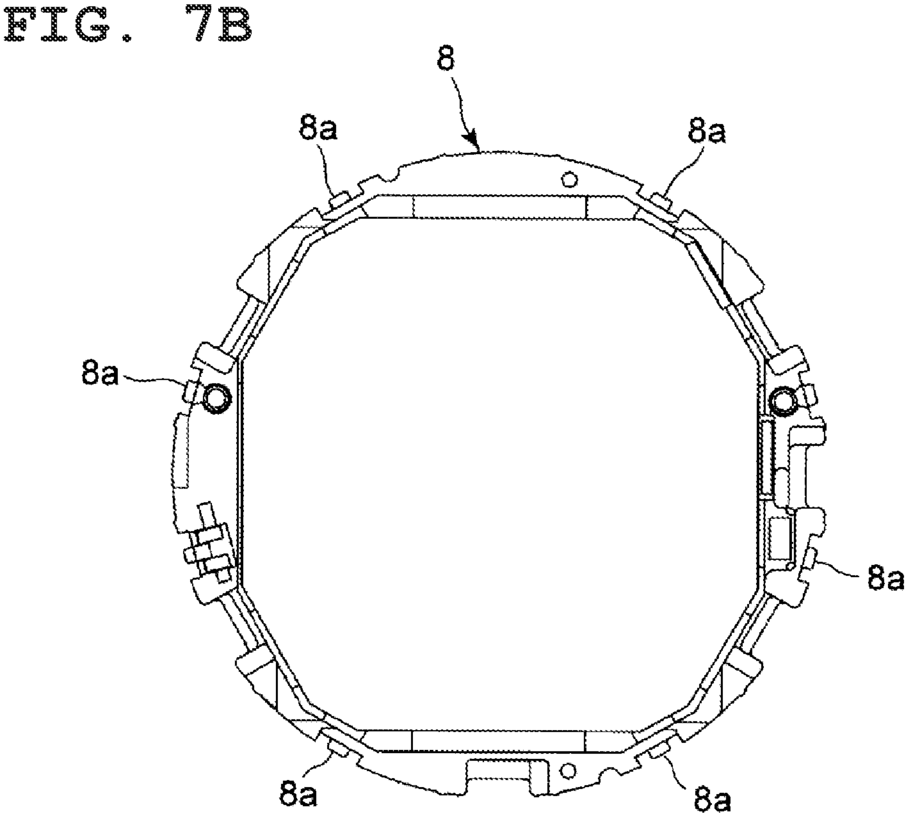
Figure 8A:
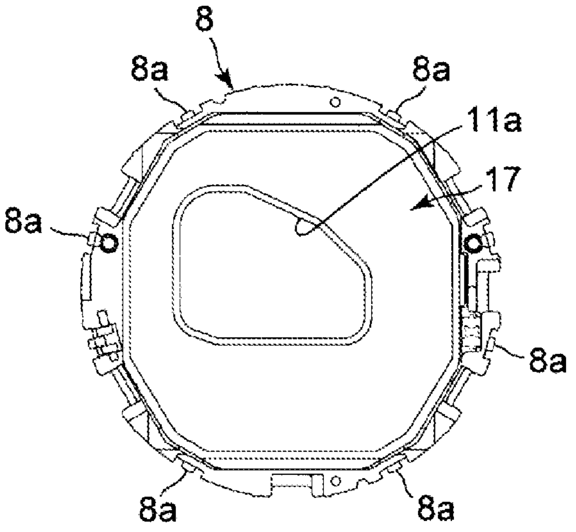
FIG. 8A is an enlarged rear view thereof.

In this procedure, first, the timepiece module 5 is assembled. In the assembly, first, the light source sections 18*a* of the lighting device 18 are attached to the outer circumferential portions of the upper housing 8 on the four o'clock side and the 10 o'clock side, as shown in FIG. 7A and FIG. 7B. In this state, the liquid crystal cell 17 is arranged in the upper housing 8, as shown in FIG. 8A.

Before this arrangement, the liquid crystal cell 17 is assembled in advance. More specifically, sealing materials (not shown) are provided on the outer circumferential portions of the pair of transparent electrode substrates 17*a* and 17*b* having the opening section 11*a* and the rim of the opening section 11*a*, liquid crystal (not shown) is injected between the pair of electrode substrates 17*a* and 17*b* in this state, the upper polarizing plate 17*c* is attached to the upper surface of the upper electrode substrate 17*a*, and the lower polarizing plate 17*d* is attached to the undersurface of the lower electrode substrate 17*b*. As a result, the liquid crystal cell 17 is assembled.

Figure 8B:
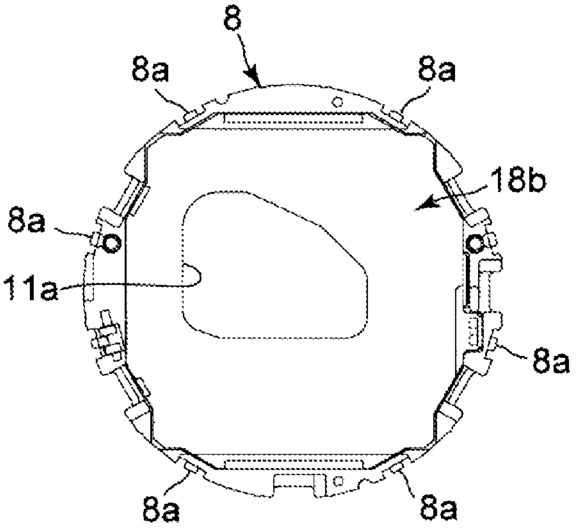
FIG. 8B is an enlarged rear view showing a state where a light guide plate has been arranged on the undersurface of the liquid crystal cell.
Figure 8C:
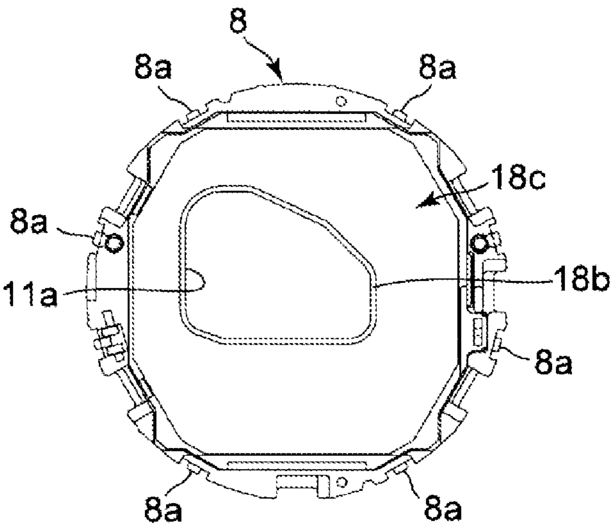
FIG. 8C is an enlarged rear view showing a state where a reflecting plate has been arranged on the undersurface of the light guide plate.

In this liquid crystal cell 17, the opening section 11*a* has been formed in a manner to include the center of the liquid crystal cell 17 and the plurality of display areas E has been formed in the portions other than opening section 11*a*, as shown in FIG. 6A and FIG. 6B. After this liquid crystal cell 17 is arranged in the upper housing 8, the light guide plate 18*b* of the lighting device 18 having the opening section 11*a* is arranged on the undersurface of the liquid crystal cell 17 as shown in FIG. 2 and FIG. 8B, and the reflective plate 18*c* having the opening section 11*a* is arranged on the undersurface of the light guide plate 18*b*, as shown in FIG. 2 and FIG. 8C.

Here, the light source sections 18*a* correspond to the outer circumferential end surface of the light guide plate 18*b* so that light emitted by the light source sections 18*a* enters into the light guide plate 18*b* and led to the entire undersurface of the liquid crystal cell 17. As a result of the above-described procedure, the assembly of the liquid crystal display panel 11 is completed, and the liquid crystal display panel 11 is arranged in the upper housing 8. In this state, in the liquid crystal display panel 11, the opening section 11*a* has been formed in a manner to include the center of the liquid crystal display panel 11 and vertically penetrate the liquid crystal display panel 11, and the plurality of display areas E has been formed in the portions excluding the opening section 11*a*.

In this state, the holding member 12 holding the timepiece movement 13 is mounted in the upper housing 8. Here, before this mounting, the timepiece movement 13 is housed in and attached to the housing and holding section 12*a* of the holding member 12 by the plurality of screws 12*d*, and a plurality of buffers 12*c* is arranged on the four corners of the upper surface of the holding member 12, as shown in FIG. 2 and FIG. 9. Then, the holding member 12 to which the timepiece movement 13 has been attached is mounted in the upper housing 8.

Figure 10:
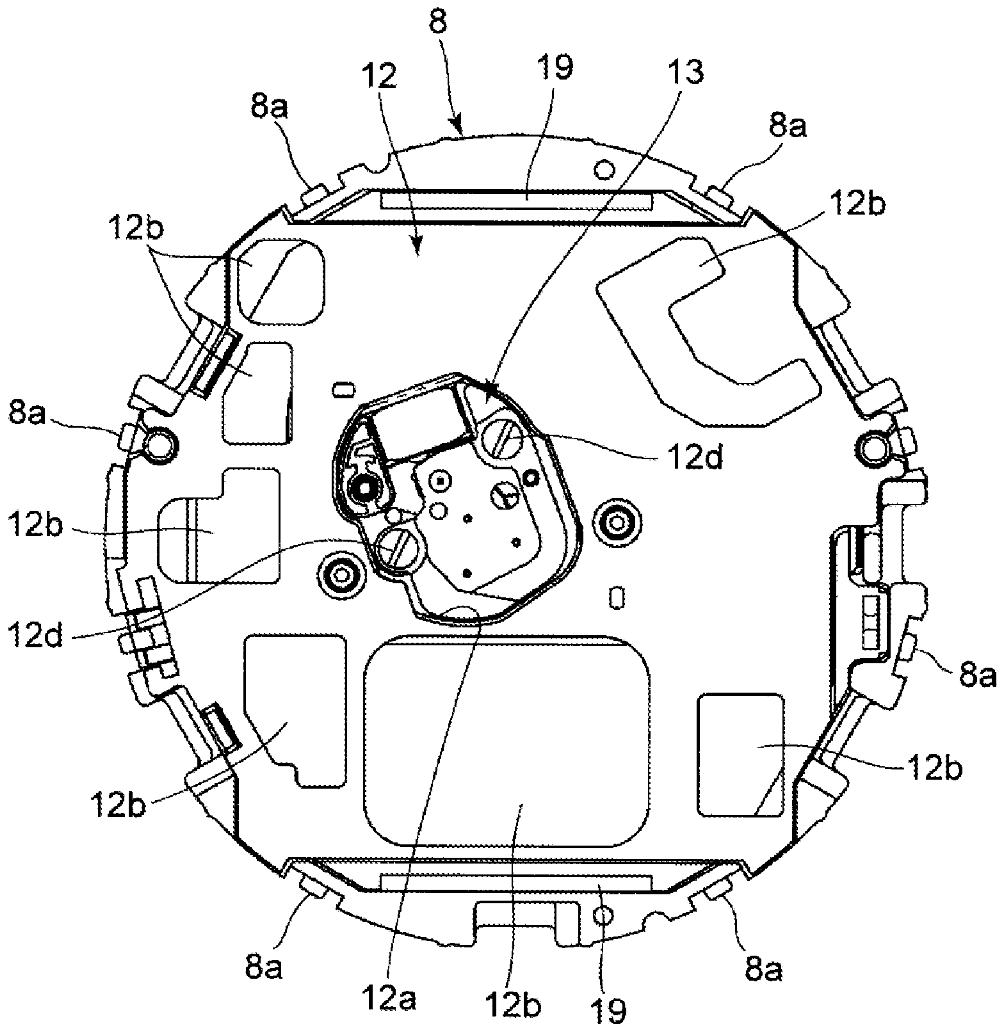
FIG. 10 is an enlarged rear view showing a state where the timepiece movement and the holding member have been arranged in an opening section in the liquid crystal display panel in the upper housing shown in FIG. 8C.

In this mounting, the timepiece movement 13 is arranged in the opening section 11*a* of the liquid crystal display panel 11 together with the housing and holding section 12*a* of the holding member 12, and the holding member 12 is positioned on the undersurface of the liquid crystal display panel 11 via the plurality of buffers 12*c*, as shown in FIG. 2 and FIG. 10. As a result, the timepiece movement 13 is arranged in parallel with the liquid crystal display panel 11. In this state, the interconnectors 19 are arranged on the electrode sections 17*e* of the liquid crystal cell 17 of the liquid crystal display panel 11, as shown in FIG. 2 and FIG. 10.

Then, the circuit board 14 is arranged on the undersurface of the upper housing 8 and the undersurface of the holding member 12, as shown in FIG. 2 and FIG. 11B. Here, the interconnectors 19 are brought into pressure contact with the electrode terminal sections 14*a* provided on the upper surface of the circuit board 14, as shown in FIG. 11A. As a result, the circuit board 14 and the liquid crystal cell 17 are electrically connected to each other, and the liquid crystal display panel 11 is held in the upper housing 8 by the interconnectors 19.

Figure 9B:
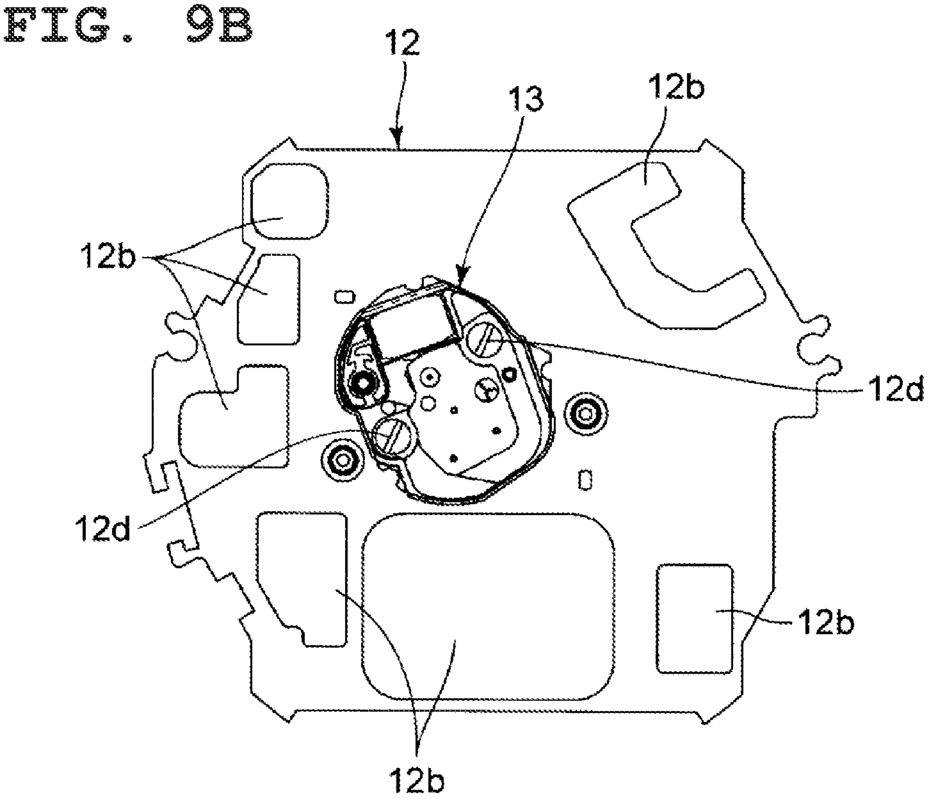

In addition, here, the plurality of electronic components 14*b* mounted on the upper surface of the circuit board 14 is arranged in the plurality of component housing sections 12*b* of the holding member 12 and located under the liquid crystal display panel 11, as shown in FIG. 2, FIG. 9B, and FIG. 11A. In this state, the circuit board 14 is attached to the holding member 12 by a screw 14*d*, as shown in FIG. 11B.

Then, the lower housing 9 is arranged under the circuit board 14, as shown in FIG. 2 and FIG. 12. Here, before this arrangement, the pair of electrode pieces 20 is attached to the battery housing section 9*a* of the lower housing 9, and the battery hold-down plate 21 is attached to the outer circumferential portion of the battery housing section 9*a*.

Then, when the lower housing 9 is arranged under the circuit board 14 in this state, the various types of electronic components 14*c* such as a quartz crystal unit and a coil mounted on the undersurface of the circuit board 14 are arranged in the component housing portions (not shown) of the lower housing 9.

In this state, the circuit hold-down plate 16 is arranged on the undersurface of the lower housing 9, and the plurality of hook sections 16*a* of the circuit hold-down plate 16 is arranged on the outer circumferential surface of the upper housing 8 through the outer circumferential surface of the lower housing 9 and the outer circumferential surface of the circuit board 14, and caught by the plurality of catching projections 8*a* formed on the outer circumferential surface of the upper housing 8. As a result, the upper housing and the lower housing 9 are attached to each other with the circuit board 14 being held therebetween.

In this state, the dial plate 10 is arranged on the upper surface of the upper housing 8. Here, the pointer shaft 13*b* of the timepiece movement 13 is inserted into a shaft hole 10*a* in the dial plate 10 in a manner to protrude above the dial plate 10. In addition, each display opening section 10*b* of the dial plate 10 is positioned corresponding to the plurality of display areas E of the liquid crystal display panel 11, which enables information displayed on the plurality of display areas E of the liquid crystal display panel 11 to be viewed through each display opening section 10*b* of the dial plate 10.

In this state, the pointers 13*a* are attached to upper end portions of the pointer shaft 13*b* of the timepiece movement 13 protruding above the dial plate 10. Here, a pointer attachment jig (not shown) is inserted into through holes 22 formed in the lower housing 9 and the circuit board 14 and pressed onto the undersurface of the timepiece movement 13. Then, in this state, the pointers 13*a* are struck from above to be fitted onto the upper end of the pointer shaft 13*b*. As a result, the pointers 13*a* are attached to the pointer shaft 13*b*.

Figure 5:
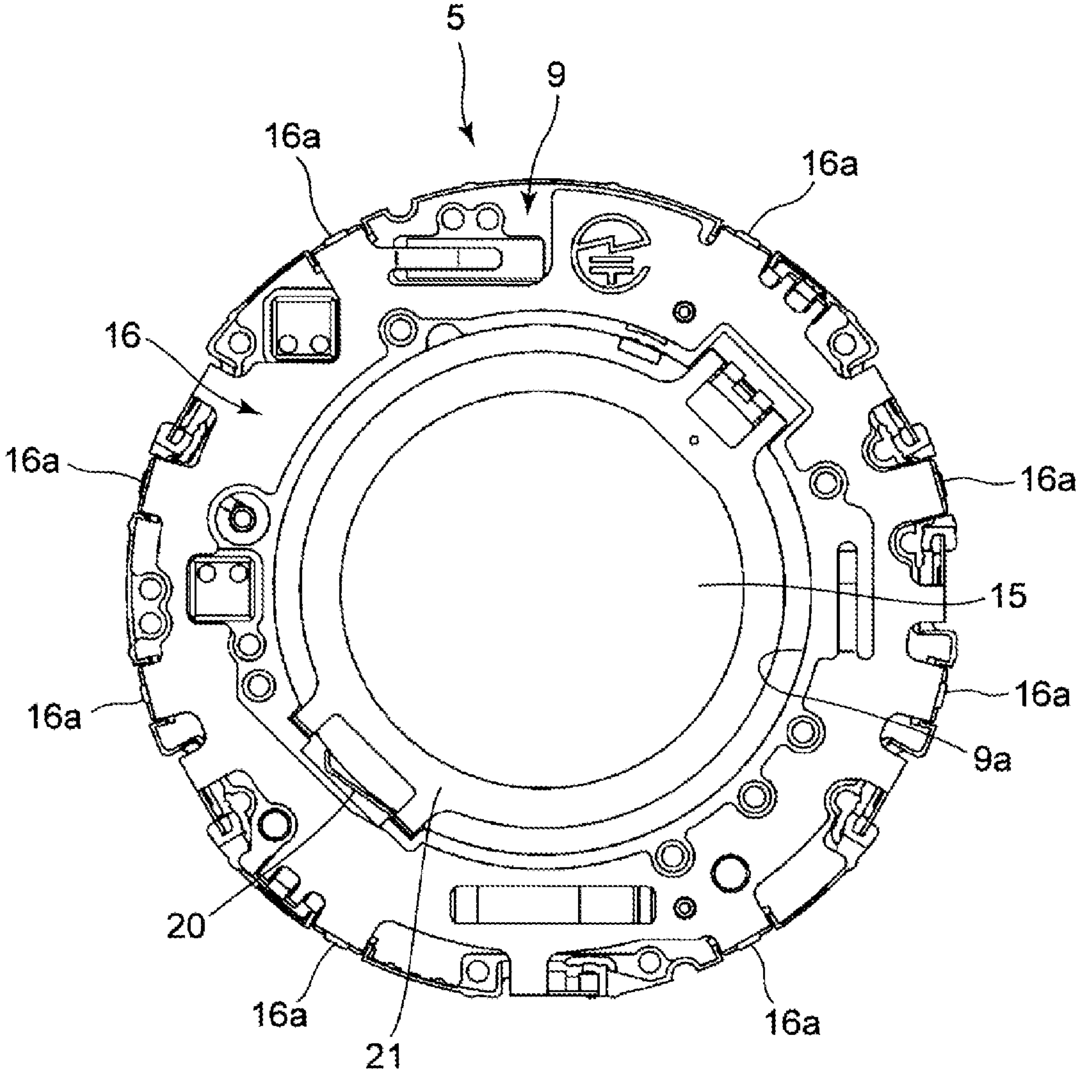
FIG. 5 is an enlarged rear view of the timepiece module shown in FIG. 3.

Then, the battery 15 is housed in the battery housing section 9*a* of the lower housing 9, as shown in FIG. 2 and FIG. 5. Here, the battery hold-down plate 21 is temporarily detached. In this state, the battery 15 is arranged in the battery housing section 9*a*, and the electrodes of the battery are brought into contact with and connected to the pair of electrode pieces 20 in the battery housing section 9*a*, as shown in FIG. 5 and FIG. 12. In this state, the battery 15 is held in the battery housing section 9*a* by the battery hold-down plate 21. As a result, the assembly of the timepiece module 5 is completed.

Next, a procedure for mounting the timepiece module 5 into the wristwatch case 1 is described.

In this case, first, the wristwatch case 1 is assembled. This wristwatch case 1 is assembled by the exterior case 1*b* being attached to the upper outer circumferential portion of the main body case 1*a*. Then, the watch glass 2 is attached to the upper opening of the wristwatch case 1, and the parting member 7 is inserted into the wristwatch case 1 in a manner to be arranged under the watch glass 2.

In this state, the button portions of the plurality of push button switches 4 are attached to the outer circumferential portions of the wristwatch case 1, and the timepiece module 5 is mounted in the wristwatch case 1 together with the middle frame 6. As a result, the timepiece module 5 is arranged in the wristwatch case 1 with the dial plate 10 being pressed against the undersurface of the parting member 7. Then, the back cover 3 is attached to the lower part of the wristwatch case 1 together with the waterproof ring 3*a*. As a result, the assembly of the wristwatch is completed.

Next, the mechanism of this wristwatch is described.

Normally, this wristwatch indicates a time of day by the pointers 13*a* being moved above the dial plate 10 by the pointer shaft 13*b* of the timepiece movement 13. In addition, various information such as a time of day, a date, a day of the week, and the like is displayed on the plurality of display areas E of the liquid crystal display panel 11. This displayed information is viewed from the outside of the wristwatch case 1 through the display opening sections 10*b* of the dial plate 10 and the watch glass 2.

As described above, the timepiece module 5 of this wristwatch includes the timepiece movement 13 which is a driving section that moves the pointers 13*a*, and the liquid crystal display panel 11 which is a display section that has the opening section 11*a* where the timepiece movement 13 is arranged, and is arranged in parallel with the timepiece movement 13, whereby the slimming down of the entire timepiece module 5 can be achieved.

That is, in this timepiece module 5, since the timepiece movement 13 is arranged in the opening section 11*a* of the liquid crystal display panel 11 and positioned in parallel with the liquid crystal display panel 11, the timepiece movement 13 and the liquid crystal display panels 11 do not vertically overlap with each other, whereby the slimming down of the entire timepiece module 5 can be achieved, which enables the slimming down of the entire wristwatch.

Also, in this timepiece module 5, the timepiece movement 13 is arranged in the housing and holding section 12*a* of the holding member 12, and the timepiece movement 13 and the housing and holding section 12*a* of the holding member 12 in this state are arranged in the opening section 11*a* of the liquid crystal display panel 11. As a result of this structure, the timepiece movement 13 can be reliably and favorably arranged in the opening section 11*a* of the liquid crystal display panel 11, and the axial length of the pointer shaft 13*b* of the timepiece movement 13 can be formed short.

Moreover, in this timepiece module 5, the opening section 11*a* of the liquid crystal display panel 11 is provided in a manner to include the center of the liquid crystal display panel 11. As a result of this structure, the timepiece movement 13 can be arranged in an area including the center of the liquid crystal display panel 11. That is, the timepiece movement 13 can be arranged in an optimal area.

Furthermore, in this timepiece module 5, the pointer shaft 13*b* to which the pointers 13*a* of the timepiece movement 13 are attached is arranged at the center of the liquid crystal display panel 11. As a result of this structure, the pointers 13*a* of the timepiece movement 13 can be favorably moved centering on the center of the liquid crystal display panel 11.

In addition, since the timepiece movement 13 is arranged in the opening section 11*a* of the liquid crystal display panel 11 and positioned in parallel with the liquid crystal display panel 11, the timepiece movement 13 can be positioned close to the watch glass 2 in the wristwatch case 1. As a result of this structure, the axial length, that is, the vertical length of the pointer shaft 13*b* can be formed short, which enables the slimming down of the entire timepiece module 5.

Also, in this timepiece module 5, the plurality of display areas E is provided on the liquid crystal display panel 11 excluding the opening section 11*a*. As a result of this structure, various types of information such as a time of day, a date, and a day of the week can be favorably displayed, whereby the user can reliably view these various types of information. In these display areas E, a number of pieces of information can be favorably displayed.

Moreover, in this timepiece module 5, the liquid crystal display panel 11 is used as a display section. Therefore, the liquid crystal display panel 11 having the opening section 11*a* can be easily manufactured. More specifically, since the liquid crystal display panel 11 has the structure where the light guide plate 18*b* and reflecting plate 18*c* of the lighting device 18 have been arranged on the undersurface of the liquid crystal cell 17, the opening section 11*a* can be easily provided penetrating through the liquid crystal cells 17, the light guide plate 18*b*, and the reflecting plate 18*c*.

That is, in the case of this liquid crystal cell 17, when liquid crystal is to be enclosed between the pair of transparent electrode substrates 17*a* and 17*b* having the opening section 11*a*, sealing materials (not shown) are provided on the outer circumferential portions of the pair of electrode substrates 17*a* and 17*b* and the rim of the opening section 11*a*, liquid crystal is injected between the pair of electrode substrates 17*a* and 17*b* in this state, the upper polarizing plate 17*c* having the opening section 11*a* is provided on the upper surface of the upper electrode substrate 17*a*, and the lower polarizing plate 17*d* having the opening section 11*a* is provided on the undersurface of the lower electrode substrate 17*b*, whereby this liquid crystal cell 17 is manufactured. That is, the liquid crystal cell 17 having the opening 11*a* can be easily manufactured.

Also, this timepiece module 5 has the upper housing 8 serving as the first housing that houses the liquid crystal display panel 11 and the timepiece movement 13, the circuit board 14 is arranged under the upper housing 8, and the electronic components 14*b* mounted on the circuit board 14 are arranged under the liquid crystal display panel 11. As a result of this structure, the slimming down of the entire timepiece module 5 can be achieved.

That is, in this timepiece module 5, the holding member 12 which holds the timepiece movement 13 is arranged on the undersurface of the liquid crystal display panel 11, and the component housing sections 12*b* which house the electronic components 14*b* such as a large-scale-integration chip mounted on the upper surface of the circuit board 14 are formed in the holding member 12. As a result of this structure, the electronic components 14*b* of the circuit board 14 can be housed in the component housing sections 12*b* of the holding member 12 and reliably and favorably arranged under the liquid crystal display panel 11.

Also, this timepiece module 5 has the lower housing 9 serving as the second housing that is arranged under the upper housing 8 via the circuit board 14 and houses the battery 15. As a result of this structure, the battery housing section 9*a* can be formed in a large area at the center of the lower housing 9, whereby the battery 15 which is housed in the battery housing section 9*a* can be upsized and its capacity can be increased. In addition, the slimming down of the entire timepiece module can be achieved.

The above-described embodiment has the structure where the lighting device 18 for the liquid crystal cell 17 of the liquid crystal display panel 11 includes the light source section 18*a*, the light guide plate 18*b*, and the reflecting plate 18*c*. However, the present invention is not limited thereto. For example, as the lighting device, a flat-type luminescent device such as an EL (electro-luminescence) light-emitting panel and a plasma light-emitting panel may be used.

Also, in the above-described embodiment, the liquid crystal display panel 11 is used as its display section. However, the present invention is not limited thereto. For example, a flat-type display panel such as an EL (electro-luminescence) display panel and a plasma display panel may be used.

Figure 13:
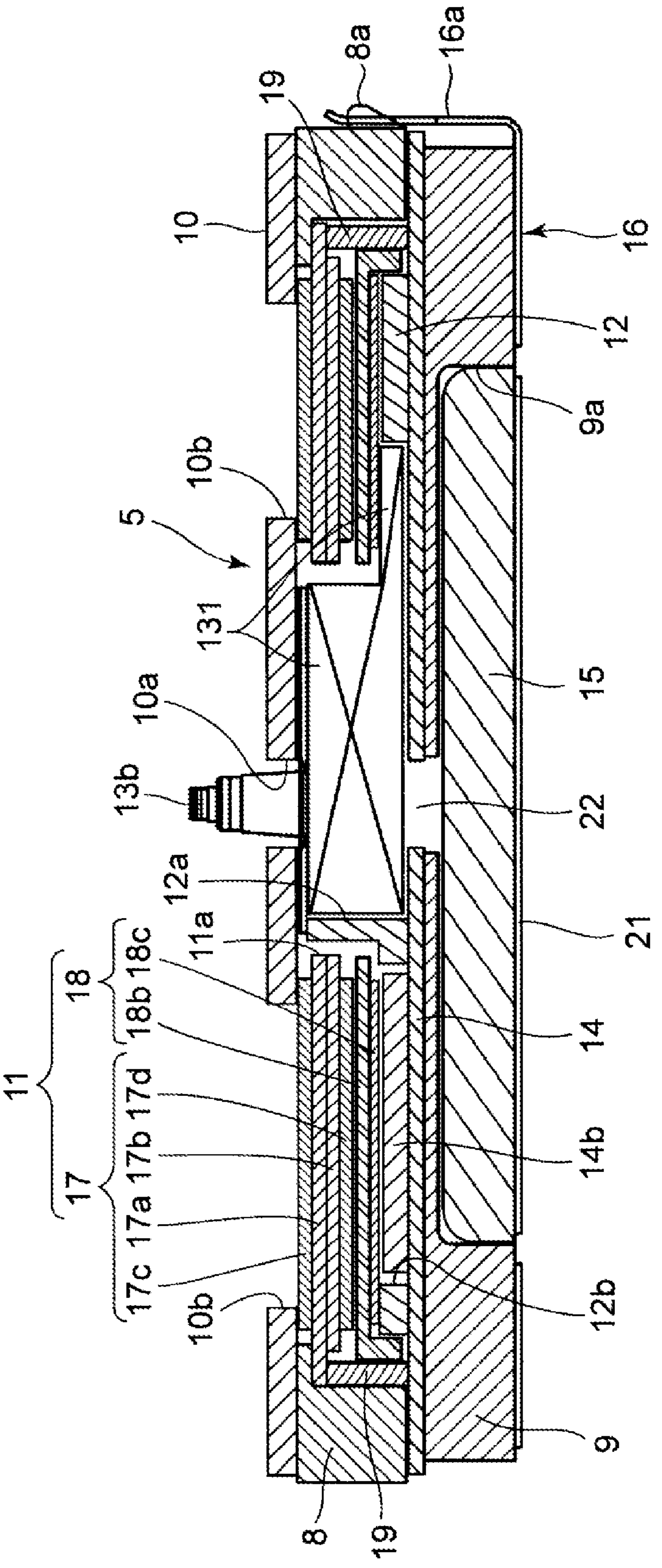
FIG. 13 is an enlarged cross-sectional view showing a modification example of the timepiece module shown in FIG. 2.

Moreover, in the above-described embodiment, the timepiece movement 13 is arranged in the opening section 11*a* of the liquid crystal display panel 11 and positioned in parallel with the liquid crystal display panel 11, as shown in FIG. 2. However, for example, a structure may be adopted in which part of the timepiece movement 131 is positioned under the liquid crystal display panel 11 such that the timepiece movement 131 and the liquid crystal display panel 11 partially overlap with each other in a planar view, as shown in FIG. 13. That is, the timepiece movement 131 may be arranged in parallel with the liquid crystal display panel 11 with at least part of the timepiece movement 131 being arranged in the opening section 11*a* of the liquid crystal display panel 11. By this structure as well, the slimming down of the entire timepiece module 5 can be achieved.

While the present invention has been described with reference to the preferred embodiments, it is intended that the invention be not limited by any of the details of the description therein but includes all the embodiments which fall within the scope of the appended claims.

INDUSTRIAL APPLICABILITY

By the present invention being applied in various types of pointer type timepieces such as a travel watch, an alarm clock, a table clock, and a wall clock, or measuring instruments such as a meter, the slimming down of them can be achieved.

The invention claimed is:

1. A module comprising:

a driving section configured to move a pointer;

a display section, wherein:

an opening section is formed to vertically penetrate the display section, and the driving section is arranged in the opening section so that the driving section does not vertically overlap with the display section;

a first housing configured to house the display section and the driving section; and a circuit board arranged under the first housing, wherein electronic components mounted on the circuit board are arranged under the display section.

2. The module according to claim 1, wherein the opening section is formed to include the center of the display section.

3. The module according to claim 2, further comprising: the pointer; and a pointer shaft, to which the pointer is attached, arranged at the center of the display section, wherein the driving section is configured to move the pointer shaft to move the pointer.

4. The module according to claim 1, wherein a plurality of display areas is provided on the display section excluding the opening section.

5. The module according to claim 1, wherein the display section is substantially equal in size to the module, and a plurality of display areas is provided on the display section excluding the opening section.

6. The module according to claim 1, wherein the display section comprises a liquid crystal display panel.

7. The module according to claim 1, further comprising: a second housing arranged under the first housing via the circuit board, and configured to house a battery.

8. A timepiece comprising the module according to claim 1.

9. The module according to claim 1, wherein the driving section moves a plurality of the pointer, and wherein a first pointer which is the longest among the plurality of the pointer is arranged so as to overlap with a display area of the display section and straddle the display area of the display section at a predetermined timing, and a tip of the first pointer is located outside an area overlapping with the display area of the display section.

10. The module according to claim 1, further comprising: a holding member which holds the driving section, wherein an area under the display section has an area where the electronic components are arranged, the electronic components being housed in component housing sections formed to vertically penetrate the holding member, and an area where the holding member is located without the electronic components being arranged.

* * * * *